(12) United States Patent
Wilpsbaeumer et al.

(10) Patent No.: US 7,811,687 B2
(45) Date of Patent: Oct. 12, 2010

(54) ADVANCED SHUTDOWN STRATEGY TO IMPROVE SAFETY AND EFFICIENCY OF FUEL CELL VEHICLES

(75) Inventors: Reiner Wilpsbaeumer, Wiesbaden (DE); Sebastian Lienkamp, Budenheim (DE); Andreas Voigt, Neu-Isenburg (DE)

(73) Assignee: GM Global Technology Operations, Inc.

( * ) Notice: Subject to any disclaimer, the term of this patent is extended or adjusted under 35 U.S.C. 154(b) by 1365 days.

(21) Appl. No.: 10/953,657

(22) Filed: Sep. 29, 2004

(65) Prior Publication Data

US 2006/0068236 A1 Mar. 30, 2006

(51) Int. Cl.
*H01M 8/00* (2006.01)
(52) U.S. Cl. .......................................... 429/12; 429/34
(58) Field of Classification Search .................... 429/12, 429/13, 25, 14, 34, 61; 137/255, 488
See application file for complete search history.

(56) References Cited

U.S. PATENT DOCUMENTS

| | | | |
|---|---|---|---|
| 6,413,662 B1 * | 7/2002 | Clingerman et al. | 429/25 |
| 6,887,606 B2 * | 5/2005 | Parr et al. | 429/22 |
| 7,367,349 B2 * | 5/2008 | Thyroff | 137/14 |
| 2006/0234094 A1 * | 10/2006 | Sakai | 429/24 |

FOREIGN PATENT DOCUMENTS

| | | |
|---|---|---|
| DE | 19707814 C1 | 8/1998 |
| WO | 02/45247 A2 | 6/2002 |

* cited by examiner

*Primary Examiner*—Jennifer Michener
*Assistant Examiner*—Monique Wills
(74) *Attorney, Agent, or Firm*—Harness, Dickey & Pierce, P.L.C.

(57) ABSTRACT

A fuel cell system includes a fuel cell stack, an anode reactant source and a shut-off valve that selectively prohibits anode reactant flow from the anode reactant source to the fuel cell stack through a conduit. A control module initiates closure of the shut-off valve to prohibit anode reactant flow through the conduit and determines a shutdown schedule based on a residual mass of the anode reactant within the conduit. The control module operates the fuel cell system using the residual mass and based on the shutdown schedule.

18 Claims, 2 Drawing Sheets

ADVANCED SHUTDOWN STRATEGY TO IMPROVE SAFETY AND EFFICIENCY OF FUEL CELL VEHICLES

FIELD OF THE INVENTION

The present invention relates to fuel cell systems, and more particularly to an advanced shutdown strategy for fuel cell systems.

BACKGROUND OF THE INVENTION

Fuel cell systems are increasingly used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode, referred to as an MEA or membrane electrode assembly. MEA's are sandwiched between conductive separator plates. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

Several components define a supply line, through which the anode reactant is supplied to the fuel cell stack. Because of the high pressures that these components can experience in traditional fuel cell systems, they must be robust. Further, the components must inhibit diffusion of the anode reactant to atmosphere while under pressure for extended periods of time (e.g., vehicle rest after shutdown). Special materials are traditionally implemented to inhibit anode reactant diffusion. Component cost and size are generally higher than desired because of the robustness and material cost.

SUMMARY OF THE INVENTION

Accordingly, the present invention provides a fuel cell system that includes a fuel cell stack, an anode reactant source and a shut-off valve that selectively prohibits anode reactant flow from the anode reactant source to the fuel cell stack through a conduit. A control module initiates closure of the shut-off valve to prohibit anode reactant flow through the conduit and determines a shutdown schedule based on a residual mass of the anode reactant within the conduit. The control module operates the fuel cell system using the residual mass and based on the shutdown schedule.

In other features, the fuel cell system further includes a pressure sensor that monitors a pressure within the conduit. The control module shuts down the fuel cell system when the pressure within the conduit achieves a desired pressure.

In another feature, the residual mass is determined based on dimensions of the conduit and a supply pressure to the conduit.

In still another feature, the control module monitors usage of the residual mass based on the shutdown schedule and shuts down the fuel cell system when the residual mass is below a threshold mass.

In yet another feature, the shutdown schedule indicates power distribution to components powered by the fuel cell system during a shutdown period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
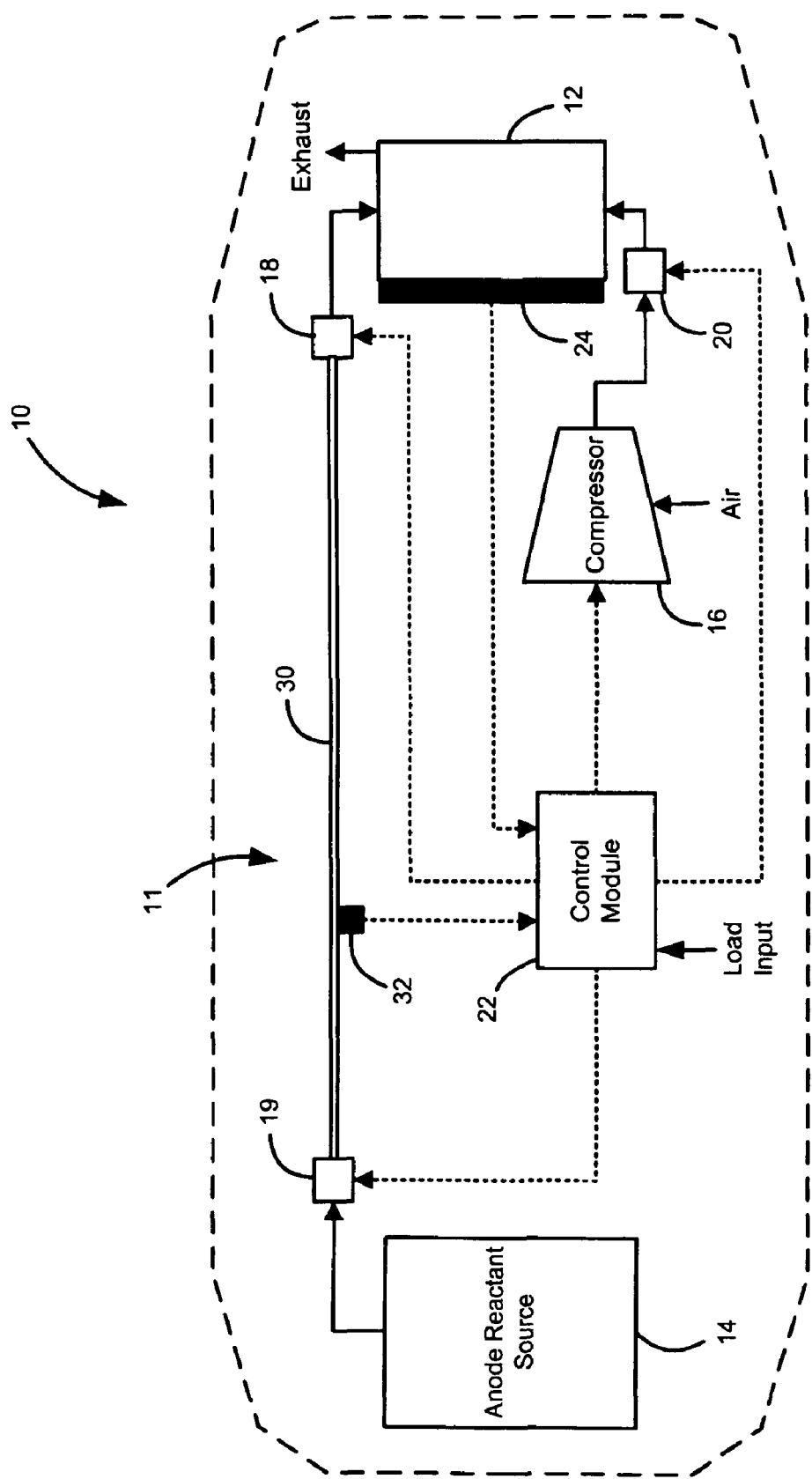
FIG. 1 is a schematic illustration of a vehicle including an exemplary fuel cell system.

Referring now to FIG. 1, an exemplary vehicle 10 includes a fuel cell system 11. The fuel cell system 11 includes a fuel cell stack 12, an anode reactant source 14 and a compressor 16. As described in further detail below, the anode reactant source 14 provides an anode reactant to the fuel cell stack 12 through a regulator 18 and a shut-off (S/O) valve 19. The compressor 16 provides pressurized, oxygen-rich air (i.e., cathode reactant) to a cathode side of the fuel cell stack 12 through a regulator 20. Reactions between the anode and cathode reactants (i.e., hydrogen and oxygen) within the fuel cell stack 12 generate electrical energy that is used to drive electrical loads (not shown). The loads include, but are not limited to an electric machine, the compressor 16, lights, a radio, electrical heaters and the like. The electrical energy can also be used to charge an energy storage device (not shown) including, but not limited to, a battery and a super-capacitor.

A control module 22 regulates overall operation of the fuel cell system 10. Measuring electronics 24 monitor characteristics (e.g., voltage, current) of the fuel cells of the fuel cell stack 12 and communicate corresponding signals to the control module 22. The control module 22 regulates operation of the fuel cell system based on a load input and the signals generated by the measuring electronics 24 of the fuel cell system 10. The load input indicates the desired electrical energy output from the fuel cell stack 12. For example, in the case of a vehicle, the load input could include a throttle. The control module 22 regulates operation of the regulator 18 and the S/O valve 19, as described in further detail below.

A conduit 30 enables the anode reactant to flow from the anode reactant source to the fuel cell stack 12. Traditionally, the anode reactant source 14 is disposed in a rear section of the vehicle 10 and the fuel cell stack 12 is disposed within a forward section of the vehicle 10. As a result, the conduit 30 can be several meters in length (e.g., 3 meters) depending upon the size of the vehicle. The S/O valve 19 is located at one end of the conduit 30 and the regulator 18 is disposed at an opposite end of the conduit 30. The S/O valve 19 controls anode reactant flow into the conduit 30 and the regulator 18 regulates reactant flow from the conduit. A pressure sensor 32 can be optionally included to monitor the anode reactant pressure within the conduit 30. The pressure sensor 32 generates a pressure signal that corresponds to the pressure within the conduit 30 and that is received by the control module 22.

The control module 22 regulates the S/O valve 19 and the regulator 19 according to the advanced fuel cell shutdown strategy of the present invention. More specifically, the control module 22 initiates a shutdown sequence based on an input. The input can include a driver initiated key-off event or can be automatically initiated when a fuel cell system shutdown is desired. Upon initiation of the shutdown sequence, the control module 22 closes the S/O valve 19 to prevent additional anode reactant from entering the conduit 30 from the anode reactant source 14. Once the S/O valve 19 has been closed, residual anode reactant remains within the conduit 30. The amount of residual anode reactant is dependent upon the internal dimensions of the conduit 30 (e.g., length, inner diameter) and the pressure.

The control module 22 operates the regulator 18 based on a selected shutdown schedule to reduce the amount of residual anode reactant within the conduit 30. The shutdown schedule generally indicates distribution of electrical energy generated by the fuel cell 12 using the residual anode reactant during shutdown. For example, the shutdown schedule can distribute the electrical energy to drive a fan, charge batteries, drive auxiliary electronics or any other electrical load that could be powered during shutdown. The shutdown schedule can prioritize electrical energy distribution. In one exemplary case, the battery voltage may be lower than a desired level at shutdown. Therefore, a shutdown schedule can be selected, which provides electrical energy to charge the batteries before providing electrical energy to power other loads. In another exemplary case, a component temperature may be higher than desired at shutdown. Therefore, a shutdown schedule can be selected, which provides electrical energy to power a cooling fan before providing electrical energy to power other loads.

By continuing to operate the fuel cell system 11 based on the shutdown schedule, the conduit pressure ($P_{COND}$) is reduced to a desired threshold ($P_{DES}$) while residual anode reactant is utilized. $P_{DES}$ is preferably approximately equal to an ambient pressure ($P_{AMB}$). Because $P_{COND}$ is approximately equal to $P_{AMB}$ during periods of non-use, component cost is reduced and safety is improved. For example, the conduit 30 and other components associated with supplying the anode reactant, do not need to be designed to deal with consistently high pressures during long periods of vehicle shut-down. In this manner, both cost and component weight are reduced. Overall safety is improved because the conduit 30 is less of a concern when performing vehicle maintenance. For example, damage to the conduit 30 will not result in a significant burst, nor will it result in a significant quantity of anode reactant being released to ambient.

As discussed above, the control module 22 can continue to operate the fuel cell system 11 based on $P_{COND}$, which is directly monitored by the pressure sensor 32. It is alternatively anticipated, however, that the control module 22 can continue operating the fuel cell system 11 based on the shutdown schedule and an estimated mass of the residual anode reactant ($m_{RES}$) within the conduit. More specifically, the control module 22 can estimate $m_{RES}$ based on the internal dimensions (e.g., length and diameter) and the supply pressure ($P_{SUP}$) from the anode reactant source. The control module 22 determines when $m_{RES}$ is reduced to a threshold mass ($m_{DES}$) based on the usage rate provided by the shutdown schedule. For example, one shutdown schedule may use the residual anode reactant at a faster rate than another shutdown schedule. $m_{DES}$ is approximately equal to a mass that would result in $P_{COND}$ being at or sufficiently near $P_{DES}$. In this manner, the pressure sensor 32 is not required and a further cost savings is realized.

Figure 2:
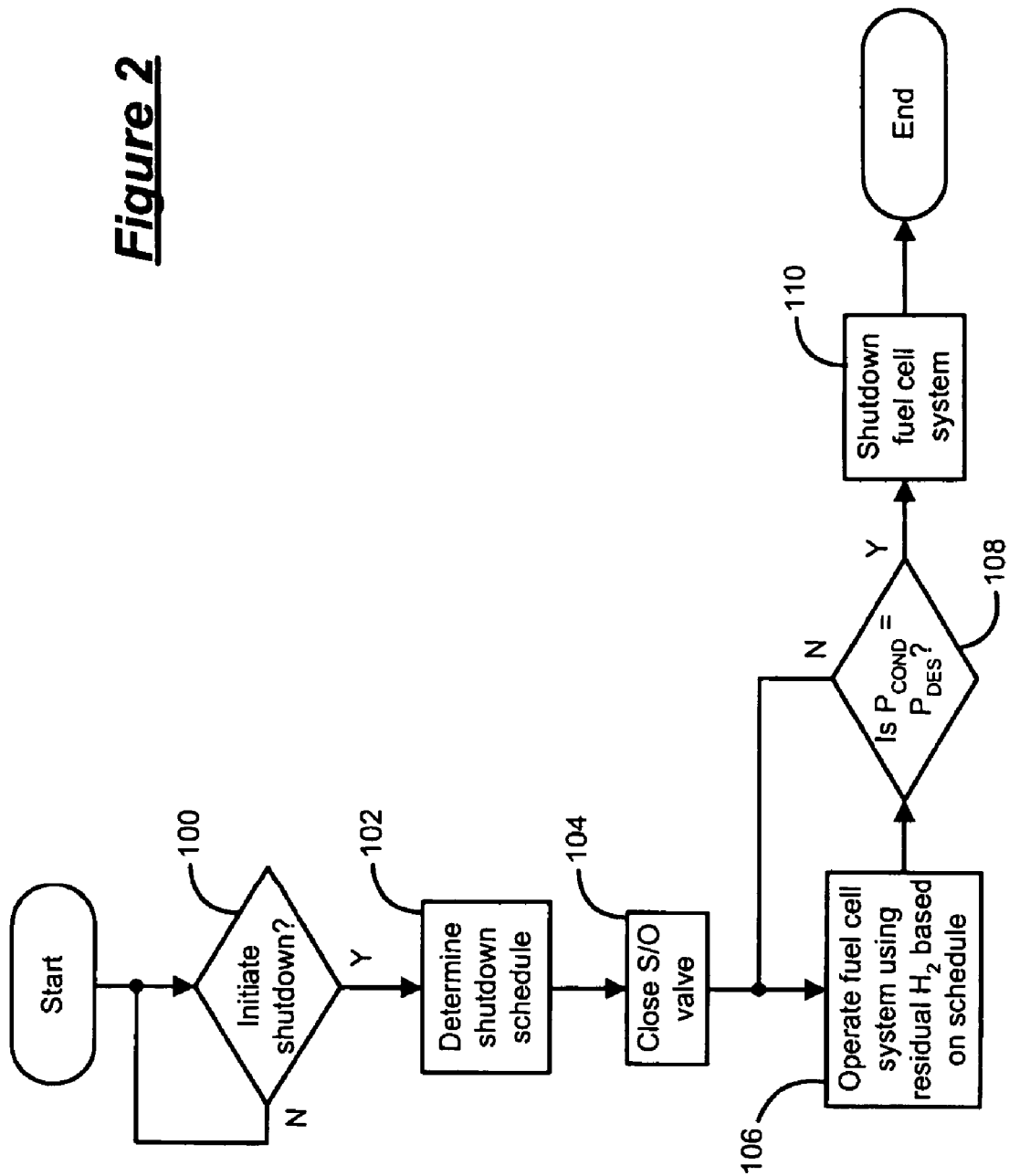
FIG. 2 is a flowchart illustrating steps performed by a control system during fuel cell system shutdown.

Referring now to FIG. 2, an exemplary advanced fuel cell shutdown strategy according to the principles of the present invention will be described in further detail. In step 100, control determines whether to initiate shutdown. If control determines not to initiate shutdown, control loops back to step 100. If control determines to initiate shutdown, control continues in step 102. In step 102, control determines the desired shutdown schedule. Control closes the S/O valve 19 in step 104. In step 106, control operates the fuel cell system 11 based on the shutdown schedule to use the residual $H_2$ within the conduit 30. In step 108, control determines whether $P_{COND}$ is equal to $P_{DES}$. If $P_{COND}$ is not equal to $P_{DES}$, control loops back to step 106. If $P_{COND}$ is equal to $P_{DES}$, control continues in step 110. In step 110, control shuts down the fuel cell system 11 by inhibiting further anode reactant flow through the regulator 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
    a fuel cell stack;
    an anode reactant source;
    a shut-off valve that selectively prohibits anode reactant flow from said anode reactant source to said fuel cell stack through a conduit; and
    a control module programmed to initiate closure of said shut-off valve to prohibit anode reactant flow through said conduit, that determines a shutdown schedule based on a residual mass of said anode reactant within said conduit when said shut-off valve is closed and that operates said fuel cell system using said residual mass to generate electrical power from aid fuel cell stack and based on said shutdown schedule.

2. The fuel cell system of claim 1 further comprising a pressure sensor that monitors a pressure within said conduit.

3. The fuel cell system of claim 2 wherein said control module is configured to shut down said fuel cell system when said pressure within said conduit achieves a desired pressure.

4. The fuel cell system of claim 1 wherein said residual mass is determined based on dimensions of said conduit and a supply pressure to said conduit.

5. The fuel cell system of claim 1 wherein said control module is configured to monitor usage of said residual mass based on said shutdown schedule and shuts down said fuel cell system when said residual mass is below a threshold mass.

6. The fuel cell system of claim 1 wherein said shutdown schedule distributes power to components powered by said fuel cell system during a shutdown period.

7. The fuel cell system of claim 1 wherein said residual mass is located within said conduit between said shut-off valve and said fuel cell stack when said shut-off valve is closed.

8. A fuel cell system, comprising:
    a fuel cell stack;
    an anode reactant source;
    a shut-off valve that selectively prohibits anode reactant flow from said anode reactant source to said fuel cell stack through a conduit; and
    a control module programmed to initiate closure of said shut-off valve to prohibit anode reactant flow through said conduit, that determines a shutdown schedule based on a residual mass of said anode reactant within said conduit located between said shut-off valve and said fuel cell stack when said shut-off valve is closed and that operates said fuel cell system using said residual mass to generate electrical power from aid fuel cell stack and based on said shutdown schedule.

9. The fuel cell system of claim 8 further comprising a pressure sensor that monitors a pressure within said conduit.

10. The fuel cell system of claim 9 wherein said control module is configured to shut down said fuel cell system when said pressure within said conduit achieves a desired pressure.

11. The fuel cell system of claim 8 wherein said residual mass is determined based on dimensions of said conduit and a supply pressure to said conduit.

12. The fuel cell system of claim 8 wherein said control module is configured to monitor usage of said residual mass based on said shutdown schedule and shuts down said fuel cell system when said residual mass is below a threshold mass.

13. A fuel cell system, comprising:
a fuel cell stack;
an anode reactant source;
a shut-off valve that selectively prohibits anode reactant flow from said anode reactant source to said fuel cell stack through a conduit; and
a control module programmed to initiate closure of said shut-off valve to prohibit anode reactant flow through said conduit, that determines a shutdown schedule based on a residual mass of said anode reactant within said conduit when said shut-off valve is closed and that operates said fuel cell system during a shutdown period when the shut-off valve is closed using said residual mass to power components powered by said fuel cell system during the shutdown period based on said shutdown schedule.

14. The fuel cell system of claim 13 further comprising a pressure sensor that monitors a pressure within said conduit.

15. The fuel cell system of claim 14 wherein said control module is configured to shut down said fuel cell system when said pressure within said conduit achieves a desired pressure.

16. The fuel cell system of claim 13 wherein said residual mass is determined based on dimensions of said conduit and a supply pressure to said conduit.

17. The fuel cell system of claim 13 wherein said control module is configured to monitor usage of said residual mass based on said shutdown schedule and shuts down said fuel cell system when said residual mass is below a threshold mass.

18. The fuel cell system of claim 13 wherein said residual mass is located within said conduit between said shut-off valve and said fuel cell stack when said shut-off valve is closed.

* * * * *